United States Patent [19]
Ogawa et al.

[11] 4,429,017
[45] Jan. 31, 1984

[54] MAGNETIC RECORDING MEDIUM

[75] Inventors: Hiroshi Ogawa; Yasuo Tamai, both of Odawara, Japan

[73] Assignee: Fuji Photo Film Co., Ltd., Minami-ashigara, Japan

[21] Appl. No.: 447,364

[22] Filed: Dec. 6, 1982

[30] Foreign Application Priority Data

Dec. 7, 1981 [JP] Japan ............................. 56-196677

[51] Int. Cl.$^3$ ..................... G11B 5/70; B32B 27/30
[52] U.S. Cl. ............................ 428/463; 428/425.8; 428/425.9; 428/692; 428/694; 428/900; 427/128; 252/62.54; 360/134; 360/135; 360/136
[58] Field of Search ............... 428/694, 692, 463, 900, 428/425.8, 425.9; 252/62.54; 360/134–136; 427/128

[56] References Cited

U.S. PATENT DOCUMENTS

| | | | |
|---|---|---|---|
| 3,840,400 | 10/1974 | Yamada | 428/900 |
| 4,153,754 | 8/1979 | Huisman | 428/900 |
| 4,307,154 | 12/1981 | Hosaka | 252/62.54 |
| 4,329,398 | 5/1982 | Hosaka | 252/62.54 |
| 4,370,384 | 1/1983 | Hosaka | 252/62.54 |

Primary Examiner—Ellis P. Robinson
Attorney, Agent, or Firm—Sughrue, Mion, Zinn, Macpeak & Seas

[57] ABSTRACT

A magnetic recording medium is disclosed. The medium is comprised of a non-magnetic support base having a magnetic layer thereon. Magnetic layer is comprised of a binder having a ferromagnetic powder dispersed therein. The binder is comprised of a copolymer of vinyl chloride/vinylidene chloride/vinyl alcohol in a ratio of 20 to 89 wt % of vinyl chloride: 10 to 60 wt % of vinylidene chloride: 1 to 20 wt % of vinyl alcohol. By utilizing the particularly disclosed polymer as the binder the magnetic recording medium has a superior capacity with respect to reproducing original sound and images and also has improved running properties and durability.

8 Claims, No Drawings

MAGNETIC RECORDING MEDIUM

FIELD OF THE INVENTION

This invention relates to a magnetic recording medium and more particularly to a magnetic recording medium having excellent electromagnetic properties, running properties and durability.

BACKGROUND OF THE INVENTION

A magnetic recording medium (particularly for an audiocassette tape which has recently been used for recording music) must have a high output level at high frequency (i.e., good frequency characteristics) as well as good reproducing ability with respect to recorded sound. Furthermore, since car stereos and radios with audiocassette recorders are becoming very common, the tapes which are repeatedly used within them must have good running properties and durability.

In a videocassette tape recording system, the wave length to be recorded is made shorter, and the track width is made narrower to achieve high density recording. Therefore, it is necessary for a tape to have a high output level and reproducing ability of an original image with a high S/N ratio. It is also necessary for a recording tape for video tape recorder (VTR), with the increase of commercial use of portable VTR, that the thickness of video tapes be 20 μm or thinner. Furthermore, the running properties and durability of the tapes have to be better than conventional video tapes. That is, audio tapes and video tapes having improved surface property, orientation, running properties and durability are required.

Various binder compositions have been proposed to improve the properties. However, no binders have been found which completely satisfy the above requirements.

Presently, binders are comprised of a mixture of a rubber type resin and a copolymer of vinyl chloride/vinyl acetate/other vinyl compound. Such binders give satisfactory results with respect to dispersibility of the ferromagnetic powder, running properties and durability of the magnetic recording layer. Generally, a copolymer of vinyl chloride/vinyl acetate/vinyl alcohol and a copolymer of vinyl chloride/vinyl acetate/maleic anhydride are used as a copolymer of vinyl chloride/vinyl acetate/other vinyl compound. Particularly, a copolymer of vinyl chloride/vinyl acetate/vinyl alcohol is often used because such a binder makes it possible to obtain excellent dispersibility of the ferromagnetic powder.

A conventionally used copolymer of vinyl chloride/vinyl acetate/vinyl alcohol is composed of 91 to 95% of vinyl chloride, 3 to 6% of vinyl acetate and 2 to 3% of vinyl alcohol. It is commercially available under the trade-name of VAGH manufactured by Union Carbide Co., Ltd., SLEC A manufactured by Sekisui Kagaku Kogyo Co., Ltd., and Denka Vinyl 1000G manufactured by Denki Kagaku Kogyo Co., Ltd.

However, the use of conventional copolymers of vinyl chloride/vinyl acetate/vinyl alcohol results in poor plasticity of the magnetic recording layer. Accordingly, it is necessary that a large amount of plasticizer or soft resin be incorporated in the copolymer. However, if a large amount of plasticizer is used, blooming readily occurs and the durability of a magnetic recording layer degrades. Further, if a large amount of soft resin is used in combination with the copolymer, the dispersibility of a ferromagnetic powder degrades and the running properties also degrade at high temperature and high humidity.

Accordingly, when a copolymer of vinyl chloride/vinyl acetate/vinyl alcohol is used, it is not possible to obtain a magnetic recording medium having satisfactory electromagnetic properties, running properties and durability.

SUMMARY OF THE INVENTION

The present inventors have investigated various binder compositions and, as a result, have found that a magnetic recording tape having excellent surface properties, orientation, running properties, durability and reproducing ability of original sounds and images can be obtained. The tape uses a binder composition mainly composed of a copolymer of vinyl chloride/vinylidene chloride/vinyl alcohol in a ratio of about 20 to about 89% by weight of vinyl chloride, about 10 to about 60% by weight of vinylidene chloride and about 1 to about 20% by weight of vinyl alcohol.

Primary object of the invention is to provide a novel magnetic recording medium.

Another object of the invention is to provide a magnetic recording medium having excellent gloss on its surface.

Yet another object of the invention is to provide a magnetic recording medium having a high squareness ratio, and excellent orientation of its ferromagnetic powder.

A fourth object of the invention is to provide a magnetic recording medium having excellent running properties and durability.

DETAILED DESCRIPTION OF PREFERRED EMBODIMENTS

The above objects of the invention can be attained by using a copolymer of vinyl chloride/vinylidene chloride/vinyl alcohol in a ratio of about 20 to about 89% by weight of vinyl chloride, about 10 to about 60% by weight of vinylidene chloride and about 1 to about 20% by weight of vinyl alcohol, as a binder.

Preferred copolymers of vinyl chloride/vinylidene chloride/vinyl alcohol have a ratio of 35 to 75% by weight of vinyl chloride, 10 to 60% by weight of vinylidene chloride and 3 to 15% by weight of vinyl alcohol, and particularly those having about 20 to about 50% by weight of vinylidene chloride are preferred. If vinylidene chloride is employed in a ratio of less than about 10% by weight, adhesiveness of a magnetic recording layer to a support degrades, and abrasion resistance decreases. If vinylidene chloride is employed in a ratio of more than about 60% by weight, heat resistance and blocking resistance of a magnetic recording medium decrease.

A ratio of vinyl alcohol is about 1 to about 20% by weight, and preferably about 3 to about 15% by weight. If vinyl alcohol is used in a ratio of less than about 1% by weight, dispersibility of the ferromagnetic recording powder decreases. If the ratio is more than about 20% by weight, solubility of a copolymer with respect to the solvent markedly decreases.

Vinyl alcohol unit of the copolymer is produced by hydrolysis of a copolymer of vinyl chloride/vinylidene chloride/vinyl acetate, and vinyl acetate sometimes remains in the copolymer depending upon the degree of hydrolysis. Preferably, the ratio of vinyl acetate which remains is not higher than 5 wt%, particularly preferably not higher than 1 wt%.

The degree of polymerization of the copolymer of vinyl chloride/vinylidene chloride/vinyl alcohol of the invention is preferably about 200 to about 700, more preferably about 300 to about 500. If the polymerization degree is less than about 200, thermal decomposition resistance decreases, and if the polymerization degree is higher than about 700, dispersibility of a ferromagnetic powder decreases. Distribution of molecular weight (Mw/Mn) is preferably 1.0 to 3.0, more preferably 1.5 to 2.5. The glass transition point (Tg) of the copolymer is preferably about 40° C. to about 100° C., more preferably about 50° C. to about 80° C. If Tg is less than about 40° C., heat resistance decreases, and if it is more than about 100° C., the surface properties of the resulting magnetic recording layer cannot be improved by a calender roll treatment.

The copolymer of vinyl chloride/vinylidene chloride/vinyl alcohol of this invention should be contained in the binder composition in a ratio of not lower than about 40% by weight, preferably not lower than about 60% by weight and more preferably not lower than about 80% by weight. If it is lower than about 40% by weight, dispersibility of the ferromagnetic power decreases.

The copolymer of vinyl chloride/vinylidene chloride/vinyl alcohol of this invention is preferably used alone. However, the copolymers can be used in combination with other resins, if necessary. Particularly, rubber type resins are preferred.

Rubber type resins which can be used in this invention include styrene butadiene rubber, butadiene rubber, isoprene rubber, chloroprene rubber, isobutyrene-isoprene rubber, acrylonitrile butadiene rubber, chlorinated butyl rubber, urethane rubber, acrylic rubber and epichlorohydrin rubber.

In addition, polyisocyanate hardening agents can be incorporated together in this invention. Polyisocyanate hardening agents include a reaction product of 1 mole of trimethylolpropane and 3 moles of diisocyanate such as tolylenediisocyanate, xylenediisocyanate and hexamethylenediisocyanate, a buret adduct compound of 3 moles of hexamethylenediisocyanate, isocyanurate adduct compound of 3 moles of tolylenediisocyanate and 2 moles of hexamethylenediisocyanate and polymer compound of diphenylmethanediisocyanate.

The above compounds are commercially available in the trade-name of "Coronate L", "Coronate HL", "Coronate 2030", "Milionate MR" and "Milionate MTL" manufactured by Nippon Polyurethane Co., Ltd., "Desmodur L", "Desmodur N", "Desmodur IL" and "Desmodur HL" manufactured by Sumitomo Bayer Urethane Co., Ltd., "Takenate D-102", "Takenate D-110N" and "Takenate D-202" manufactured by Takeda Pharmaceutical Industry Co., Ltd.

In this invention, polyisocyanate can be used in the ratio of not more than 30% of the binder composition. If the content ratio is more than 30%, adhesiveness between the magnetic recording layer and support is decreased.

In this invention, a plasticizer, a stabilizing agent, a lubricant or the like may be added as additives to the magnetic recording layer in addition to the above described binder. Examples of plasticizer include dibutyl phthalate, dioctyl phthalate, dioctyl adipate and epoxidated vegetable oils. Examples of stabilizing agent include white lead ($PbO.H_2O.2PbCO_3$), tribasic lead sulfate ($3PbO.PbSO_4.H_2O$), lead stearate ($Pb(C_{18}H_{35}O_2)_2$), dibutyl tin dilaurate, dibutyl tin maleate and Epikote 828 and 834 (epoxy resins produced by Shell Chemical Co.). Examples of lubricant include saturated fatty acids having 12 or more carbon atoms and esters thereof and paraffin wax. These additives are mentioned in more detail in "Vinyl Chloride Resins" published by Nikkan Kogyo Shinbun Co., Ltd.

The magnetic recording medium of this invention is prepared by coating on a support a magnetic composition containing a ferromagnetic powder, additives and an organic solvent dispersed in a binder, followed by drying.

Examples of preferred ferromagnetic powders include $\gamma\text{-}Fe_2O_3$, Co-modified iron oxide and an alloy fine powder mainly composed of iron.

Details relating to useful ferromagnetic powders, additives, organic solvents, dispersing and coating methods are described in U.S. Pat. Nos. 3,047,428, 4,108,787, 4,015,030, 4,066,565, 4,069,164, 4,125,474, 4,267,207, 3,904,538, 3,943,012, 4,009,111, 4,306,921, 4,071,654, 3,833,412, 4,110,503, 4,135,016 and 4,201,809 herein incorporated by reference.

The invention will be explained in more detail by the following examples, but the scope of the invention should not be limited to the examples. In the examples, "part" means "part by weight".

EXAMPLE 1

| | |
|---|---|
| $\gamma\text{-}Fe_2O_3$ (Hc: 400 Oe; acicular ratio: 10/1; and average particle length: 0.4 μm) | 100 parts |
| Copolymer of vinyl chloride/vinylidene chloride/vinyl alcohol (the ratio is shown in Table 1; and Polymerization degree: 400) | Amount shown in Table 1 |
| Polyester polyurethane (molecular weight: 130,000) | Amount shown in Table 1 |
| Oleic acid | 2 parts |
| Dimethylpolycyloxane (polymerization degree: about 60) | 0.5 part |
| Butyl acetate | 250 parts |

The above composition is kneaded and dispersed for 48 hours in a ball mill and is filtrated by a filter having an average pore diameter of 3 microns to provide a magnetic coating composition.

The coating composition obtained was coated on a polyethylene terephthalate film having a thickness of 7 microns in a dry thickness of 5 microns by means of a reverse roll. The coated film was subjected to a magnetic orientation by an electric magnet of 100 gauss and the magnetic recording layer was then dried. The dried magnetic recording layer was subjected to a supercalender roll treatment to make the surface of the magnetic recording layer more smooth. The magnetic tape obtained was slit to a width of 3.81 mm and put into Phillips-type compact cassettes to provide audiocassette tape Nos. 1 to 10. The characteristics of the tapes thus obtained are shown in Table 1.

COMPARATIVE EXAMPLE 1

The same procedure as in Example 1 was repeated except that a copolymer of vinyl chloride/vinyl acetate/vinyl alcohol (91/6/3 wt%) which is conventionally used was used instead of the copolymer of vinyl chloride/vinylidene chloride/vinyl alcohol used in Example 1, to obtain audiocassette tape Nos. C-1 to C-5. The characteristics of the tapes thus obtained are shown in Table 1.

C ... Stain was observed at more than about 10% of the head surface.

TABLE 1

| Tape No. | VC (wt %) | VDC (wt %) | VOH (wt %) | VC.VDC.VOH Copolymer (part) | PU (part) | Surface Gloss Degree | Squareness Ratio (Br/Bm) | Adhesiveness (g) | Audio Running Properties | Head Stain | Tape Squeal | $MOL_{315}$ (dB) | $SOL_{10K}$ (dB) |
|---|---|---|---|---|---|---|---|---|---|---|---|---|---|
| Example 1 | | | | | | | | | | | | | |
| 1 | 87 | 10 | 3 | 20 | 2 | 150 | 0.88 | 40 | A | A | A | 0.2 | 0.6 |
| 2 | 77 | 20 | 3 | 20 | 0 | 160 | 0.89 | 30 | A | A | A | 0.4 | 0.7 |
| 3 | 77 | 20 | 3 | 18 | 2 | 165 | 0.88 | 50 | A | A | A | 0.6 | 0.8 |
| 4 | 67 | 30 | 3 | 20 | 0 | 170 | 0.89 | 60 | A | A | A | 0.7 | 1.6 |
| 5 | 57 | 40 | 3 | 20 | 0 | 170 | 0.89 | 65 | A | A | A | 0.9 | 1.9 |
| 6 | 47 | 50 | 3 | 20 | 0 | 170 | 0.89 | 70 | A | A | B | 0.9 | 1.8 |
| 7 | 75 | 20 | 5 | 20 | 0 | 170 | 0.89 | 45 | A | A | A | 1.0 | 2.0 |
| 8 | 70 | 20 | 10 | 20 | 0 | 175 | 0.90 | 50 | A | A | A | 1.2 | 2.3 |
| 9 | 65 | 20 | 15 | 20 | 0 | 170 | 0.89 | 40 | A | A | A | 0.5 | 1.9 |
| 10 | 60 | 20 | 20 | 20 | 0 | 165 | 0.88 | 35 | A | A | A | 0.3 | 0.8 |
| Comparative Example 1 | | | | | | | | | | | | | |
| C-1 | 91 | VAC 6 | 3 | 20 | 0 | 120 | 0.88 | 0 | D | B | A | −0.3 | −1.2 |
| C-2 | 91 | VAC 6 | 3 | 18 | 2 | 140 | 0.87 | 10 | C | C | B | −0.3 | −0.5 |
| C-3 | 91 | VAC 6 | 3 | 16 | 4 | 150 | 0.86 | 30 | B | B | C | −0.5 | −0.3 |
| C-4 | 91 | VAC 6 | 3 | 14 | 6 | 165 | 0.86 | 40 | A | A | D | −0.3 | 0.6 |
| C-5 | 55 | VAC 20 | 25 | 20 | 0 | 140 | 0.86 | 20 | A | A | B | 0.0 | 0.1 |

(NOTE)
VC: vinyl chloride;
VDC: vinylidene chloride;
VOH: vinyl alcohol;
VAC: vinyl acetate; and
PU: polyester polyurethane.

The various tape characteristics indicated in Table 1 were measured by the following methods:

(a) Surface gloss:
The percent of total reflection was measured with a standard gloss meter (digital gloss meter Model GK 45 D of Suga Testing Machine Co., Ltd.) at an angle of incidence of 45° and an angle of reflection of 45°.

(b) Squareness ratio:
The ratio of the residual flux density (Br) to the maximum flux density (Bm) was measured in an external magnetic field of 1 KOe, using a vibratory flux magnetic meter Model VSM-3 of Toei Kogyo Co., Ltd.

(c) Adhesiveness:
Strength (g) of magnetic layer where the magnetic layer adhered on an adhesive (splicing) tape is stripped from the adhesive tape at an angle of 180° was measured.

(d) Audio running properties:
Tape running tests were conducted with 100 commercial cassette tape decks under the conditions of 25° C., 50% RH and 40° C., 80% RH to see how orderly the tape samples could be wound, and the results were evaluated on a four-grade basis.
 A ... could be wound orderly.
 B ... could not be wound orderly on 1 to 5 decks.
 C ... could not be wound orderly on 5 to 10 decks.
 D ... could not be wound orderly on more than 11 decks.

(e) Head stain:
After evaluation of the tape running properties, the head of each deck was checked for the presence of stain and the results were evaluated on a three-grade basis.
 A ... Stain was observed at not more than about 2% of the head surface.
 B ... Stain was observed at about 2 to about 10% of the head surface.

(f) Tape squeal:
The presence of any tape squeal was also checked during the tape running test (d), and the results were evaluated on a four-grade basis.
 A ... No tape squeal was heard.
 B ... Occasional squeals were heard during 1 or 2 passes.
 C ... Squeals were heard during 3 to 5 passes, occasionally.
 D ... Occasional squeals were heard during 5 or more passes and continuous squeals were heard during 1 to 2 passes.

(g) $MOL_{315}$
Maximum output level at 315 Hz (distortion factor 3%) was measured with cassette tape deck Model 582 of Nakamichi Co., Ltd. using Fuji Cassette ERC-90 manufactured by Fuji Photo Film Co., Ltd. as a control tape that was assumed to produce an output of 0 dB.

(h) $SOL_{10K}$
Saturated output level at 10 KHz was measured using the control tape that was assumed to produce an output of 0 dB.

EXAMPLE 2

| | |
|---|---|
| Co-coated Berthollide iron oxide (Co: 3.0 atomic % coating; $FeO_{14}$; Hc: 660 Oe; acicular ratio: 10/1; and average particle length: 0.4 μm) | 100 parts |
| Copolymer of vinyl chloride/vinylidene chloride/vinyl alcohol (The ratio is shown in Table 2; and polymerization degree: 400) | Amount shown in Table 2 |
| Polyester polyurethane (molecular weight: about 130,000) | Amount shown in Table 2 |
| Oleic acid | 2 parts |
| 2-ethylhexyl stearate | 0.5 part |
| Alumina (average particle diameter: 0.5μ) | 4 parts |

-continued

| | |
|---|---|
| Butyl acetate | 250 parts |

The above composition was kneaded and dispersed for 48 hours in a ball mill, and 6.7 parts (solid content: 5.0 parts) of polyisocyanate (trade-name "Coronate L-75" manufactured by Nippon Polyurethane Co., Ltd.) was added to the composition, and it was further kneaded and dispersed for 1 hour. The thus obtained composition was filtrated by a filter having an average pore size of 1 micron to obtain a magnetic coating composition. The coating composition was coated on a polyethylene terephthalate film having a thickness of 14 microns in a dry thickness of 5 microns by means of a reverse roll. The coated film was subjected to a magnetic orientation by a magnet of 3000 gauss and then dried. The magnetic recording layer was then subjected to a supercalender roll treatment to make the surface of the magnetic recording layer more smooth. The magnetic tape obtained was slit to a width of ½ inch and put in VHS type cassettes to obtain video cassette tape Nos. 11 to 14. The characteristics of the tapes are shown in Table 2.

COMPARATIVE EXAMPLE 2

The same procedure as in Example 2 was repeated using a conventionally used copolymer of vinyl chloride/vinyl acetate/vinyl alcohol (91/6/3 wt%) instead of the copolymer of vinyl chloride/vinylidene chloride/vinyl alcohol used in Example 2 to obtain video cassette tape Nos. C-6 to C-8. The characteristics of the tapes are shown in Table 2.

EXAMPLE 3

The same procedure as in Example 2 was repeated using Fe-Zn alloy fine powder (Fe:Zn=90:10; Hc; 1300 Oe; acicular ratio: 10/1; and average particle size: 0.4μ) instead of Co-coated Berthollide iron oxide to obtain video cassette tape No. 15. The characteristics of the tape is shown in Table 2.

COMPARATIVE EXAMPLE 3

The same procedure as in Comparative Example 2 was repeated using Fe-Zn alloy fine powder (Fe:Zn=90:10; Hc: 1300 Oe; acicular ratio: 10/1; and average particle size: 0.4μ) instead of Co-coated Berthollide iron oxide to obtain video cassette tape No. C-9. The characteristics of the tape is shown in Table 2.

TABLE 2

| Tape No. | VC (wt %) | VDC (wt %) | VOH (wt %) | VC.VDC.VOH Copolymer (part) | PU (part) | Surface Gloss Degree | Squareness Ratio (Br/Bm) | Adhesiveness (g) | Video Running Properties | Still Life (min.) | Video Output (dB) | S/N Ratio (dB) |
|---|---|---|---|---|---|---|---|---|---|---|---|---|
| Example 2 | | | | | | | | | | | | |
| 11 | 77 | 20 | 3 | 15 | 5 | 165 | 0.87 | 25 | A | not less than 120 | 0.5 | 50 |
| 12 | 67 | 30 | 3 | 15 | 5 | 170 | 0.87 | 30 | A | not less than 120 | 1.0 | 51 |
| 13 | 57 | 40 | 3 | 20 | 0 | 175 | 0.88 | 30 | A | not less than 120 | 1.3 | 52 |
| 14 | 47 | 50 | 3 | 20 | 0 | 175 | 0.88 | 40 | A | not less than 120 | 1.5 | 52 |
| Comparative Example 2 | | | | | | | | | | | | |
| C-6 | 91 | VAC 6 | 3 | 10 | 10 | 170 | 0.86 | 25 | C | 30 | 0.5 | 48 |
| C-7 | 91 | VAC 6 | 3 | 15 | 5 | 160 | 0.86 | 10 | B | 60 | 0.0 | 45 |
| C-8 | 91 | VAC 6 | 3 | 20 | 0 | 140 | 0.87 | 0 | C | 20 | −1.5 | 41 |
| Example 3 | | | | | | | | | | | | |
| 15 | 67 | 30 | 3 | 15 | 5 | 240 | 0.84 | 25 | A | 50 | 11.0 | 50 |
| Comparative Example 3 | | | | | | | | | | | | |
| C-9 | 91 | VAC 6 | 3 | 15 | 5 | 210 | 0.88 | 5 | B | 30 | 6.0 | 60 |

The various tape characteristics indicated in Table 2 were measured by the following methods:
(i) Surface gloss
 The same test as in (a) set forth above was conducted.
(j) Squareness ratio:
 The ratio of the residual flux density (Br) to the maximum flux density (Bm) was measured in an external magnetic field of 2 KOe for tape Nos. 11 to 14 and C-6 to C-8 and 5 KOe for tape Nos. 15 and C-9.
(k) Adhesiveness:
 The same test as in (c) set forth above was conducted.
(l) Video running properties:
 Video tape running tests were conducted with 50 commercial VHS video tape decks under the conditions of 25° C., 50% RH and 40° C., 80% RH to see if any jitter or skew occurred, and the results were evaluated on a three-grade basis.
A . . . No jitter or skew
B . . . Some but insignificant jittering or skewing
C . . . Frequent jittering or skewing caused a problem
(m) Still life:
 The time (min) for a serious defect to occur in a picture reproduced in a still mode was measured using a Model NV-6600 of Matsushita Electric Industrial Co., Ltd.
(n) Video output:
 The output at 4 MHz was measured using Model NV-6600 of Matsushita Electric Industrial Co., Ltd.

using VHS tape of Fuji Photo Film Co., Ltd. as a control tape that was assumed to produce an output of 0 dB.
(o) S/N ratio:

The S/N ratio at 10 KHz to 4 MHz after visibility correction was measured with Model NV-6600 of Matsushita Electric Industrial Co., Ltd.

The following is clear from the above Examples and Comparative Examples.

In Table 1, audiocassette tape Nos. 1 to 10 using a copolymer of vinyl chloride/vinylidene chloride/vinyl alcohol of this invention had superior surface gloss and squareness ratio resulted from better dispersibility with respect to ferromagnetic particles as compared to conventional tape Nos. C-1 to C-5 using a conventionally used copolymer of vinyl chloride/vinyl acetate/vinyl alcohol.

Adhesiveness to the support was excellent when using this invention regardless of whether rubber type resins were used.

A copolymer of this invention does not result in problems with respect to audio running properties, head stain and tape squeal, which occasionally occur when using conventional copolymers. Particularly, it should be noted that poor running properties were obtained with tape No. C-1 where rubber type resins were not used.

The copolymer of this invention has more $MOL_{315}$ and $SOL_{10K}$ than a conventional copolymer, and thus has a high capacity for reproducing original sound. Accordingly, it is clear from Table 1 that a magnetic recording medium using a copolymer of vinyl chloride/vinylidene chloride/vinyl alcohol of this invention has a much greater capacity in reproducing original sound, as well as better running properties and durability.

In Table 2, video tape No. 11 to 15 using a copolymer of vinyl chloride/vinylidene chloride/vinyl alcohol of this invention has a larger degree of surface gloss and squareness ratio and make it possible to obtain better dispersibility of Co-coated Berthollide iron oxide and alloy fine particles than video tape Nos. C-6 to C-9 using a conventional copolymer of vinyl chloride/vinyl acetate/vinyl alcohol. The tapes of this invention have excellent video running properties, long still life, running properties and durability, and superior capacity with respect to reproducing original sound due to their high video output and S/N ratio.

It is clear from the above Examples and Comparative Examples that a binder containing a copolymer of vinyl chloride/vinylidene chloride/vinyl alcohol of this invention provides a magnetic recording medium which has excellent dispersibility of the ferromagnetic particles, as well as superior electromagnetic properties, running properties and durability as compared with a recording medium using a binder containing a conventional copolymer of vinyl chloride/vinyl acetate/vinyl alcohol.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a nonmagnetic support base having thereon a magnetic recording layer having a ferromagnetic powder dispersed in a binder, the binder being comprised of a copolymer of vinyl chloride/vinylidene chloride/vinyl alcohol in a ratio of 20 to 89 wt% of vinyl chloride: 10 to 60 wt% of vinylidene chloride: 1 to 20 wt% of vinyl alcohol.

2. A magnetic recording medium, as claimed in claim 1, wherein the ratio of the vinyl chloride/vinylidene chloride/vinyl alcohol is 35 to 75 wt% of vinyl chloride: 10 to 60 wt% of vinylidene chloride: 3 to 15 wt% of vinyl alcohol.

3. A magnetic recording medium as claimed in claim 2, wherein the ratio of the vinyl chloride/vinylidene chloride/vinyl alcohol is 35 to 75 wt% of vinyl chloride: 20 to 50 wt% of vinylidene chloride: 3 to 15 wt% of vinyl alcohol.

4. A magnetic recording medium as claimed in claim 1, wherein the ratio of the vinyl chloride/vinylidene chloride/vinyl alcohol is 20 to 89 wt% of vinyl chloride: 20 to 50 wt% of vinylidene chloride: 3 to 15 wt% of vinyl alcohol.

5. A magnetic recording medium as claimed in claim 1, wherein the copolymer has a degree of polymerization of about 200 to about 700.

6. A magnetic recording medium as claimed in claim 1, wherein the binder is comprised of 40% by weight or more of the copolymer.

7. A magnetic recording medium as claimed in claim 6, wherein the binder is comprised of 60% by weight or more of the copolymer.

8. A magnetic recording medium as claimed in claim 7, wherein the binder is comprised of 80% or more by weight of the copolymer.

* * * * *